United States Patent [19]

Brown

[11] 3,815,667

[45] June 11, 1974

[54] HEAT EXCHANGE PROCESS AND APPARATUS

[76] Inventor: Ted R. Brown, 1212 Princeton Ave., Salt Lake City, Utah 84105

[22] Filed: May 14, 1973

[21] Appl. No.: 359,803

Related U.S. Application Data

[62] Division of Ser. No. 172,968, Aug. 19, 1971, abandoned.

[52] U.S. Cl............................ 165/2, 165/1, 423/522
[51] Int. Cl. ............................................... F28c 1/00
[58] Field of Search ............. 55/267, 268, 269, 222, 55/223; 261/DIG. 11, 127, 128, 148, 149; 423/522

[56] References Cited
UNITED STATES PATENTS

| | | | |
|---|---|---|---|
| 2,150,750 | 3/1939 | Rogers et al. | 423/522 |
| 2,199,691 | 5/1940 | Carter | 423/522 |
| 2,879,135 | 3/1959 | Haltmeier | 423/522 |
| 3,147,074 | 9/1964 | Maurer | 423/522 |
| 3,525,586 | 8/1970 | Drechsel et al. | 423/522 |
| 3,607,034 | 9/1971 | Henry | 423/522 |
| 3,647,360 | 3/1972 | Jaeger | 423/522 |

*Primary Examiner*—Manuel A. Antonakas
*Assistant Examiner*—Daniel J. O'Connor
*Attorney, Agent, or Firm*—H. Ross Workman

[57] ABSTRACT

Heat exchange process and apparatus for efficiently reducing the temperature of a liquid or gas for beneficial use. One embodiment illustrating the invention comprises treating sulfur dioxide-containing saturated gas so that the water content of the saturated gas is lowered enough to accommodate formation of highly concentrated sulfuric acid. The process includes adiabatically cooling water or other liquid by passing dry gas through the liquid to nearly saturate the gas and cool the water to near the entering wet bulb temperature of the gas. The cooled water is then used to scrub sulfur dioxide-containing saturated gas to reduce its temperature. When the water content of the sulfur dioxide-containing gas has been reduced and the gas transferred out of the presence of moisture, heat exchangers may be used to adjust the temperature of the sulfur dioxide-containing gas prior to transfer to the acid plant.

11 Claims, 4 Drawing Figures

INVENTOR.
TED R. BROWN
BY H. Ross Workman
ATTORNEY

HEAT EXCHANGE PROCESS AND APPARATUS

This application is a division of my copending Patent application Ser. No. 172,968, filed Aug. 19, 1971, and now abandoned.

BACKGROUND

1. Field of the Invention

The present invention relates to the production of low temperature gases and liquids for beneficial use such as process and apparatus for reducing temperature of sulfur dioxide-containing saturated gas to minimize the water content and thus prevent dilution in the manufacture of acid.

2. The Prior Art

Low concentration sulfur dioxide gas is a common by-product of copper production and other industrial processes. Recovery of the sulfur dioxide in the gas is desirable because it reduces air pollution and may be used in the production of sulfuric acid. Its value in the production of sulfuric acid is, however, largely dependent upon the concentration of acid which can be produced by the sulfur dioxide-containing gas.

It has been found that unless saturated gas containing about 3 to 3½ percent sulfur dioxide is lowered to a temperature of about 83°F, the saturated gas contains too much water to make concentrated acid. Saturated sulfur dioxide-containing gas is commonly available at a temperature of about 120°F and at that temperature the gas must be scrubbed with water or other liquid at a temperature of about 56°F to lower the gas sufficiently to be within the 83°F limit.

The problem to be resolved relates to how cooling liquid having a maximum temperature of about 56°F can be obtained to scrub the hot sulfur dioxide-containing saturated gas. It is known that passing water through ambient air in a cooling tower is a means of cooling the water. A process of that nature is described in U.S. Pat. No. 3,541,761. Ambient air, however, is not always sufficiently cool or dry to adequately reduce the water temperature. It has been found that concentrated acid often cannot be made, for example, during summer months when the temperature of the ambient air rises.

BRIEF SUMMARY AND OBJECTS OF THE INVENTION

The present invention includes process and apparatus for reducing the temperature of a fluid for any desired use in climates and localities where it is not possible under existing weather conditions or where quantities of sufficiently cool fluid are not available or economically feasible. The present invention can also be used where it would show improved performance or economic advantages to do so. The process includes pre-cooling a gas stream having a low moisture content (or having produced a low moisture content by adsorption or absorption), adiabatically reducing the temperature of the gas stream by saturating the gas stream with moisture and thereafter considering the gas stream as low temperature fluid in final usable form or by using the low moisture content gas stream to adiabatically reduce the temperature of a liquid.

It is, therefore, a primary object of the present invention to provide a system of cooling sulfur dioxide-laden gas to produce low saturated gas temperatures in climates and localities where sufficiently low temperature water is not economically available for cooling the saturated gas.

It is another object of the present invention to eliminate the necessity of using specialized and other high cost heat exchangers for cooling saturated sulfur dioxide-laden gas.

One still further primary object of the present invention is to provide a saturated sulfur dioxide-containing gas stream capable of producing concentrated acid with a very low sulfur dioxide concentration in the gas stream.

One still further object of the present invention is to reduce the sulfur dioxide emissions into the atmosphere to as low a point as possible.

Another and no less important object of the present invention is to reduce plant first costs coincident with reasonable or reduced operating costs.

These and other objects of the present invention will become more fully apparent from the following description and appended claims taken in conjunction with the accompanying drawings.

DETAILED DESCRIPTION OF THE PREFERRED EMBODIMENTS

General

Figure 1:
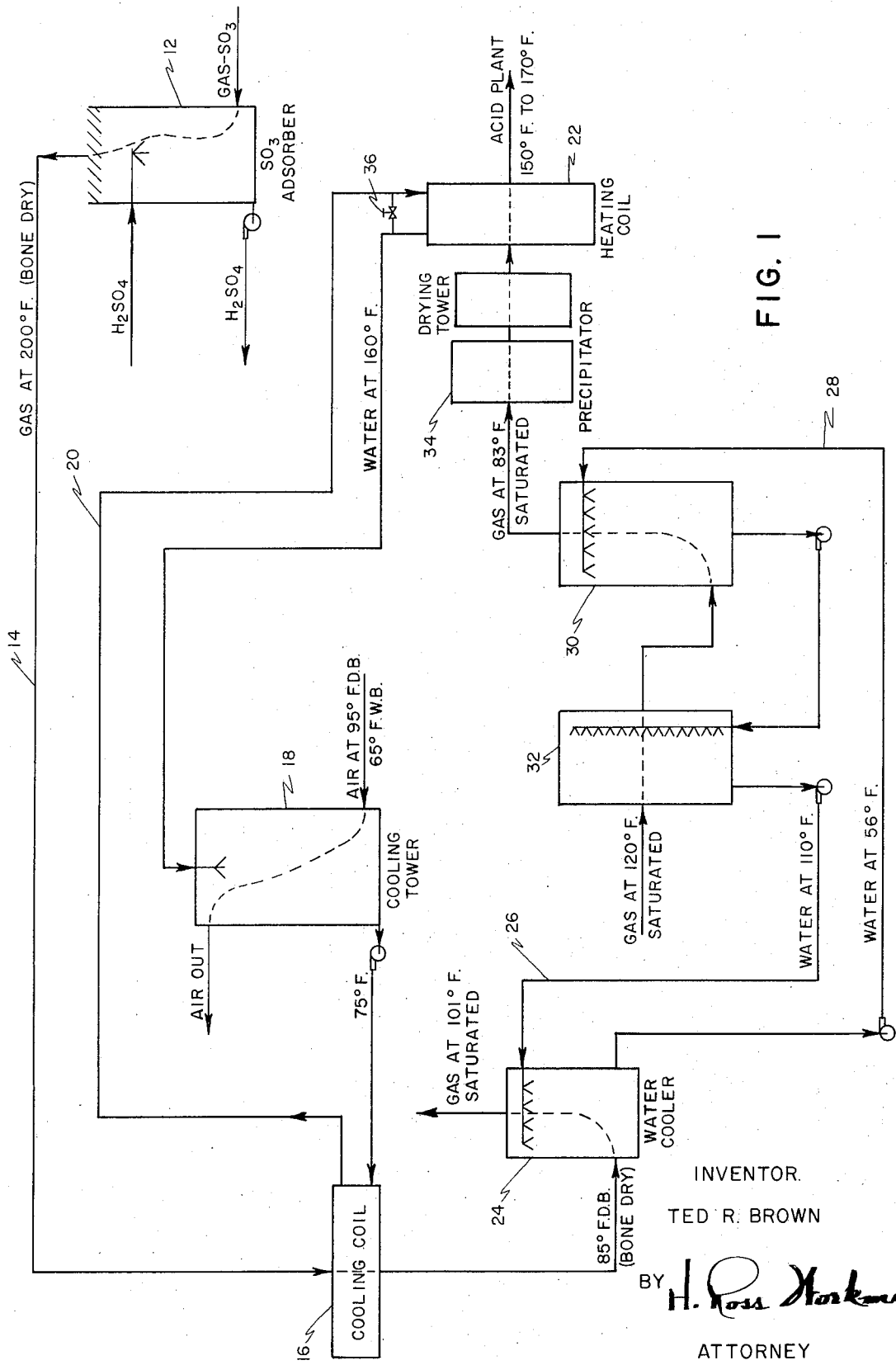
FIGS. 1 and 2 are schematic flow diagrams illustrating fluid circuits and apparatus for reducing water temperature to produce sulfur dioxide-containing gas with low water content according to the present invention.

Heat exchange processes such as used in cooling and airconditioning systems have always been required to have increased capacity in order to adequately cool liquid or gas when the temperature and/or the humidity of external air climbs as in summer months and on hot days. Heretofore on hot or humid days, essentially cold water and air were producible only by the use of refrigeration systems. Heat exchangers, although normally less expensive than refrigeration systems, frequently have a lower effective limit to which they can cool fluids on hot and humid days.

While it is relatively easy and comparatively inexpensive to remove heat from liquids and gases when the temperature of the liquid or gas is high, the difficulty with which heat is removed increases at an astonishing rate when the temperature of the liquid or gas is already low. Thus, generally speaking, it is much easier and less expensive to make hot fluids cool than to make cool fluids cold using prior art techniques. Historically, the approach used to make cool fluids cold was to increase the size and capacity of cooling and heat exchange systems.

The present invention includes obtaining a high temperature dry gas and pre-cooling the gas in a conventional heat exchanger.

According to the present invention, the temperature of the pre-cooled gas is then adiabatically reduced so that the gas is cold. Adiabatic processes are defined as those processes carried out in such a manner that heat is not exchanged between the system and its surroundings. Thus, the adiabatic cooling step does not require an energy input to reduce the temperature. When the gas is adiabatically cooled according to the present invention, heat is not actually removed from the cooling system but is reduced psychometrically, as will now be more fully described.

If a stream of gas is intimately mixed with a quantity of recirculating liquid at a given temperature in an adiabatic system, the temperature of the gas will drop and its humidity will increase. Furthermore, the temperature of the recirculating liquid will approach the wet bulb temperature of the gas.

The temperature of a liquid can also be similarly adiabatically reduced. The pre-cooled dry gas may be scrubbed with a liquid which, rather than recirculating at about the wet bulb temperature of the gas, is heated for example in any one of a variety of industrial processes. The heated liquid, when used to scrub the dry gas, has its temperature reduced to about the wet bulb temperature of the entering gas. The low temperature liquid may then be used in any number of beneficial ways such as, for example, in reducing moisture content of sulfur dioxide-bearing gas to make concentrated acid production possible.

In the illustrated embodiments of the invention, apparatus and processes are described which may be modified without departing from the essential characteristics of the invention. For example, while specific temperatures are referred to for ease of illustration, it should be appreciated that a wide range of corresponding temperature variations may be used to accomplish the same result. Also, the cooling liquid used for scrubbing gases is described as water. Clearly, any one of a variety of suitable cooling liquids could be used. Reference will now be made to the figures wherein like parts are designated with like numerals throughout.

The Process and Apparatus of FIG. 1

The heat exchange process illustrated in FIG. 1 commences with obtaining bone-dry gas at a temperature of about 200°F. One common source of the gas is the stack of a metallurgical furnace. Frequently, stack gases are eventually passed through a sulfur trioxide adsorber 12. The sulfur trioxide adsorber 12 is an integral part of a conventional sulfuric acid plant (not shown).

While the gas in line 14 is described as bone-dry, it should be appreciated that gas may be used which has relatively small amounts of moisture. However, maximum efficiency is produced when the gas is bone-dry. Furthermore, ambient air may be used as a source of cooling gas and, in some circumstances, may be preferable to exhaust gases. If ambient air is used, it should be either very dry or first dehumidified with conventional water removal apparatus (not shown).

The dry gas is passed through a cooling coil 16. Cooling coil 16 may be any suitable conventional heat exchanger, one presently preferred type being the DuPont or metallic tube variety which uses water as an exchange medium. Water is pumped to the cooling coil 16 from a cooling tower 18 of a suitable well-known type at a temperature approaching 75°F. As the water emerges from the cooling coil 16, it has a temperature of about 180°F and is conducted through line 20 to a heating coil 22. The purpose for heating coil 22 will be described hereafter. After water emerges from the heating coil 22, it is conducted again to the cooling tower 18 where it is scrubbed with air, as is conventional, until it approaches or reaches the 75°F temperature. Ambient air in most circumstances will be adequate to reduce water temperature that low.

It should be appreciated that the cooling coil 16 can be economically and advantageously used without fouling caused by corrosion even if the gas in line 14 carries small amounts of sulfur dioxide or sulfur trioxide or sulfuric acid because the gas is substantially dry. The dry gas emerging from the cooling coil 16 has a dry bulb temperature of about 85°F.

The bone-dry pre-cooled gas is then conducted into an adiabatic heat exchanger 24 which may be in the form of a water cooler. Water at a temperature of about 110°F is conducted into the top of the water cooler through line 26 and sprayed downwardly over the bone-dry gas. The gas emerges saturated with water at a temperature of about 101°F. The water originally at a temperature of about 110°F is cooled through the saturation of the gas to a temperature of about 56°F. The low temperature cooling water is then pumped along line 28 to gas scrubbers 30 and 32. If desired, scrubbers 30 and 32 may be combined into a single scrubber or separated into separate sections of a single scrubber.

Saturated gas having a sulfur dioxide concentration of about 3 to 3½ percent and a temperature of about 120°F is then conducted serially through the scrubbers 32 and 30. The sulfur dioxide-containing gas is a common by-product of metallurgical furnaces and other industrial processes and has, in the past, been discharged into the air. The sulfur dioxide in the gas can be advantageously used to make sulfuric acid. However, saturated gas at temperatures above 83°F having a sulfur dioxide concentration of less than, for example, 3½ percent comprises so much moisture that concentrated acid cannot be made. Concentrated acid can only be made when the temperature of the saturated gas is reduced to about 83°F or lower, so that excess moisture is eliminated prior to transfer of the gas to the acid plant. Additionally, if the sulfur dioxide content of the gas is lower than 3 percent, say for example 2 percent, the temperature of the saturated gas must be correspondingly reduced below 83°F. In the illustrated embodiment, the gas emerging from the scrubber 30 has a temperature at least as low as 83°F and is passed through a precipitator 34 to be sure that all possible solid and liquid material is removed. Thereafter, the gas is transferred to the acid plant.

The sulfur dioxide-laden gas transferred to the acid plant is desirably heated to a temperature of about 150°F and up to about 780°F in order that it may be properly processed to acid. One conventional way of heating sulfur dioxide-containing gas is to pass the gas through a natural gas-heated heat exchanger. When the natural gas is ignited, the temperature of the sulfur dioxide-containing saturated gas will rise to the required temperature. It has been found that heating coil 22 may be interposed in the path of the sulfur dioxide-laden gas to function as a heat exchanger to heat the gas. If desired, a valve 36 may be used in conjunction with the heating coil 22 to control the temperature of gas transferred to he acid plant. Heating of the sulfur dioxide-containing saturated gas at this location does not dilute, rehumidify or saturate the gas because the heating process is out of the presence of moisture.

Figure 2:
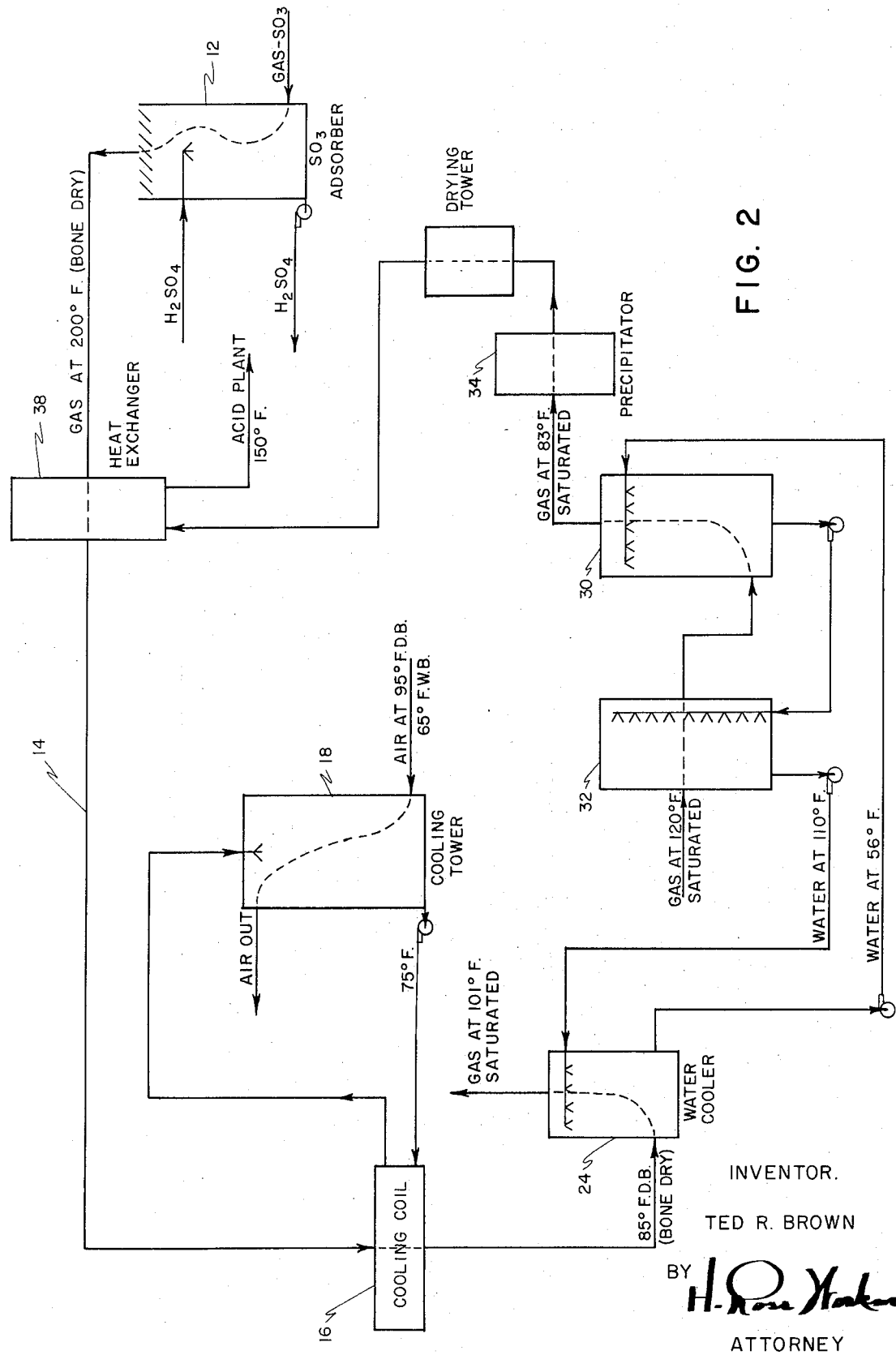
Figure 3:
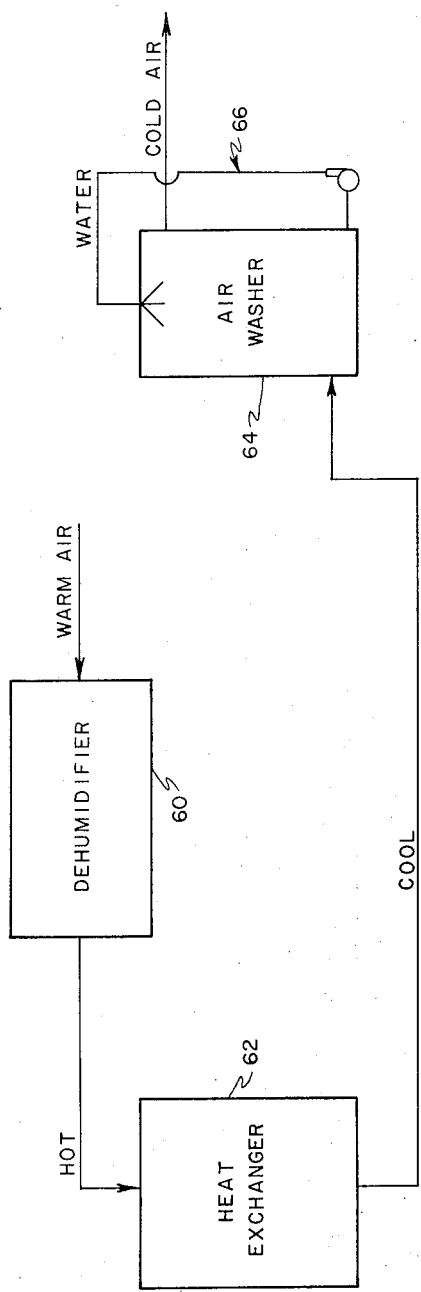
Figure 4:
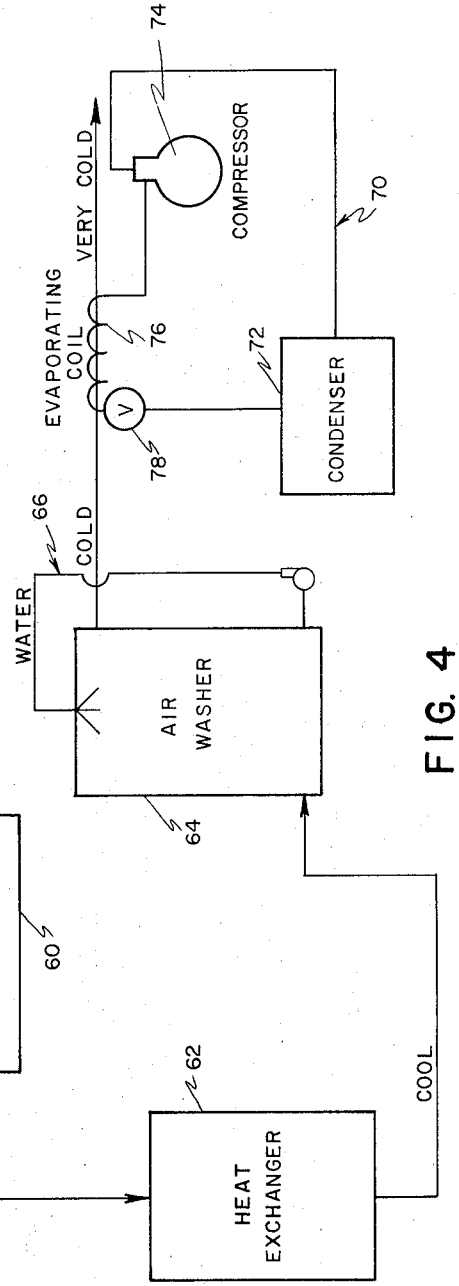

The Process and Apparatus of FIG. 2

The embodiment of FIG. 2 is, in many ways, substantially the same as the embodiment of FIG. 1. Those portions of the process of FIG. 2 which differ from the FIG. 1 embodiment will now be described.

The bone-dry gas emerging from the sulfur trioxide adsorber 12 is passed first through heat exchanger 38 which has the effect of reducing the temperature of the gas in line 14. The dry gas is again passed through cooling coil 16 to reduce the temperature of the gas to about 85°F dry bulb. The fluid circuit for supplying cooling water to the cooling coil 16 includes the cooling tower 18 into which the comparatively hot water from cooling coil 16 is sprayed into contact with ambient air so that the water is cooled to approximately 75°F. The cooler water is then returned to the cooling coil. This circuit differs from the fluid circuit supplying the cooling coil 16 of FIG. 1 in that a heat exchanger is not interposed in the high temperature water line from the cooling coil. Furthermore, if heat exchanger 38 removes sufficient heat from the gas in line 14, the cooling coil 16 and its attendant cooling circuit can be eliminated.

As described above, the bone-dry gas is saturated in the water cooler 24 so as to reduce the temperature of cooling water from about 110°F to about 56°F. That water is then used in scrubbers 30 and 32 to reduce the temperature of saturated sulfur dioxide-laden gas from approximately 120°F to approximately 83°F. However, it may be desirable to indirectly cool the scrubber water by use of a heat exchanger disposed between the water cooler 24 and the recirculating water in scrubbers 30 and 32.

When the saturated sulfur dioxide-laden gas emerges from the scrubber 30, it is passed first through the precipitator 34 and, thereafter, into a conventional heat exchanger 38. The heat exchanger 38 elevates the temperature of the sulfur dioxide-containing saturated gas to about 150°F so as to make the gas more desirable for use in the acid plant. In this system, as in the system of FIG. 1, the gas scrubbers 30 and 32 remove moisture from the saturated gas by reducing the temperature and the heat exchanger tends to reduce the use of fuel that might otherwise be necessary to heat the dry saturated gas in the sulfuric acid plant.

From the foregoing, it can be appreciated that water can be cooled to a surprisingly low level independent of the ambient air temperature or humidity. This low temperature water can then be used to cool saturated sulfur dioxide-containing gas sufficiently to make the production of concentrated acid possible. Also, significantly, the temperature of the saturated sulfur dioxide-containing gas is reduced substantially below that possible with conventional means.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a process for reducing the temperature and moisture content of sulfur dioxide-containing gas saturated with moisture comprising the steps of pre-cooling a low moisture content gas stream so as to reduce its dry bulb temperature; adiabatically cooling a liquid by passing the gas stream through the liquid until the gas stream approaches saturation; and scrubbing the sulfur dioxide-containing gas with the cooled liquid so as to minimize the moisture content of the sulfur dioxide-containing gas.

2. In a process as defined in claim 1 wherein said pre-cooling step is preceded by treating ambient air to remove moisture and thereafter exposing the air to a heat exchanger to reduce the temperature of the dry gas.

3. In a process as defined in claim 2 wherein said air is reduced to a dry bulb temperature of on the order of about 83°F to 87°F.

4. A process as defined in claim 1 wherein said adiabatically cooling step comprises saturating the pre-cooled gas stream to reduce the liquid temperature to on the order of about 53°F to 59°F.

5. In a process as defined in claim 1 wherein said scrubbing step comprises directing sulfur dioxide-containing moisture-saturated gas through at least one cooling device so as to be in contact with the cooled liquid sufficiently to reduce the temperature of the sulfur dioxide-containing gas to on the order of about 81°F to 85°F.

6. A process for optimizing the amount of moisture in saturated sulfur dioxide-containing gas, comprising the steps of:
   mingling with water a bone-dry gas having a temperature which is low compared to the water;
   allowing the gas to become saturated and thereby adiabatically cooling the water; and
   scrubbing sulfur dioxide-containing moisture-saturated gas with the cooled water to lower the temperature and moisture content of the sulfur dioxide-containing gas.

7. A process for making moisture-saturated sulfur dioxide-containing gas available with sufficiently low moisture content to make concentrated sulfuric acid, the steps of:
   passing bone-dry gas through a first heat exchanger to reduce the wet bulb temperature of the gas, transferring the heat in the bone-dry gas in said first heat exchanger to a liquid cooling medium, transporting the cooling medium in a circuit from a cooling tower at a low temperature to the first heat exchanger;
   conducting the cooled bone-dry gas to a first water cooler;
   adiabatically cooling water in the first cooler by saturating the bone-dry gas;
   conducting the cooled water through gas scrubbing means; and
   scrubbing high temperature sulfur dioxide-containing moisture-saturated gas with the cooled water to substantially reduce the temperature and moisture content of the sulfur dioxide-containing gas.

8. A process as defined in claim 7 further comprising directing the cooling medium which emerges at a high temperature from the first heat exchanger to a second heat exchanger and passing the cooled sulfur dioxide-containing gas through the second heat exchanger to adjust the temperature without significantly increasing the moisture content thereof prior to transfer of the sulfur dioxide-containing gas to an acid plant.

9. Apparatus for reducing the temperature of saturated sulfur dioxide-containing gas comprising in combination means for providing bone-dry gas; means accommodating adiabatic cooling of a liquid by mingling the bone-dry gas and liquid until the gas becomes saturated; and means for scrubbing sulfur dioxide-containing gas with the cooled liquid to lower the temperature of the sulfur dioxide-containing gas.

10. Apparatus for reducing the temperature of sulfur dioxide-containing moisture-saturated gas comprising in combination:

means directing bone-dry gas through a first heat exchanger to reduce the dry bulb temperature of the gas, said first heat exchanger forming part of a first fluid circuit for a liquid cooling medium, said first circuit comprising a cooling tower for cooling the liquid medium prior to the transfer thereof to the first heat exchanger and means conducting effluent from the first heat exchanger to a second heat exchanger;

means accommodating adiabatic cooling of a liquid by saturating the bone-dry gas with the liquid and means conducting the bone-dry gas from the first heat exchanger to the adiabatic cooling means;

a second fluid circuit comprising means conducting the cooled liquid from the adiabatic cooling means to gas scrubbing means;

means directing the sulfur dioxide-containing gas through the gas scrubbing means to lower the temperature of the sulfur dioxide-containing saturated gas, and means for conducting the liquid again to the adiabatic cooling means; and means conducting the cooled saturated sulfur dioxide-containing gas through the second heat exchanger.

11. Apparatus for reducing the temperature of a sulfur dioxide-containing moisture-saturated gas comprising in combination:

means transferring bone-dry gas through a heat exchanger;

adiabatic cooling means for exposing the bone-dry gas to a liquid until the gas is saturated and the liquid cooled and means conducting the bone-dry gas to the adiabatic cooling means;

circuit means comprising gas scrubbing means and means for transferring cooled liquid from the adiabatic cooling means to the gas scrubbing means;

means directing sulfur dioxide-containing moisture-saturated gas through the gas scrubbing means to lower the temperature of the sulfur dioxide-containing gas; and means conducting the sulfur dioxide-containing gas through the first heat exchanger prior to transfer to an acid plant.

* * * * *

UNITED STATES PATENT OFFICE
CERTIFICATE OF CORRECTION

Patent No. 3,815,667                     Dated June 11, 1974

Inventor(s) Ted R. Brown

It is certified that error appears in the above-identified patent and that said Letters Patent are hereby corrected as shown below:

Column 4, line 21, after "scrubber." should read --The water recirculating in lines 26 and 28 advantageously permits $SO_2$ contaminants, if any, to be minimized in accordance with well-known stripping techniques (e.g. by placing an atmospheric scrubbing or vacuum stripper between scrubber 32 and cooler 24).--

Signed and sealed this 1st day of October 1974.

(SEAL)
Attest:

McCOY M. GIBSON JR.
Attesting Officer

C. MARSHALL DANN
Commissioner of Patents